3,095,404
PREPARATION OF HIGH VISCOSITY WATER-SOLUBLE POLYCATIONICS

Dwight C. Lincoln, Coatesville, Pa., and Walter P. Shyluk, Wilmington, Del., assignors to Hercules Powder Company, Wilmington, Del., a corporation of Delaware
No Drawing. Filed Apr. 7, 1959, Ser. No. 804,602
4 Claims. (Cl. 260—88.3)

This invention relates to a process of preparing high-viscosity water-soluble polymers from solutions of vinyl pyridinium salts.

For many applications water-soluble polymers of high viscosity give much better results than the same water-soluble polymers of lower viscosities. This is especially true for uses as a flocculant, retention aid, etc. Prior art processes have been inadequate either from the standpoint of process of properties of the product, or both.

An object of the present invention is a process of preparing high-viscosity water-soluble polymers from solutions of vinyl pyridinium salts. A further object is such a process wherein said salts are polymerized in aqueous solutions. An additional object is such a process wherein said salts are those derived from 2-methyl-5-vinyl pyridine, e.g. 1,2-dimethyl-5-vinyl pyridinium methyl sulfate. The above and other objects will be apparent from the description of this invention given hereinafter.

The above and other objects are accomplished according to the present invention by carrying out the process which comprises dissolving a water-soluble monomeric vinyl pyridinium salt in a solvent therefor to a concentration of at least about 50% and allowing the monomer to polymerize at a temperature not above about 30° C. According to a preferred embodiment of this invention, the solvent for the monomer is water and the polymerization is carried out in the presence of a catalyst and in the substantial absence of air. More specifically preferred is a monomer concentration of 65%–85% and a potassium persulfate ($K_2S_2O_8$) catalyst concentration of 0.001–0.008. Excellent results have been obtained with 75% 1,2-dimethyl-5-vinyl pyridinium methyl sulfate and 0.004% potassium persulfate dissolved in water and polymerized at 25° C. with a nitrogen cover, all percentages being by weight based on the monomer.

The following examples illustrate specific embodiments of the present invention. In these examples and elsewhere herein, the percent monomer and all parts are by weight; all other percentages are likewise by weight and, in addition, are based on the amount of monomer used.

The process used in carrying out these examples was as follows: The monomer and catalyst, when a catalyst was used, were dissolved in water. In most examples air was removed from the polymerization reaction vessel (polyethylene bottles and tubes) and this was done by replacing the air with nitrogen. The polymerization was carried out in the aqueous solution under the temperature and time conditions specified. The polymerization gives a polymer in the form of a rubber-like gel. Various process and product data are given in Table 1 below.

In the examples of Table 1, the conversions were determined by U.V. analysis on aqueous solutions of the polymer product. Reduced specific viscosities (RSV) were determined in Ubbelohde viscometers (No. 1) using 0.500% solutions of the polymer product in 0.200 M aqueous sodium chloride. In each of the examples in Table 1, the monomer used was 2-methyl-5-vinyl pyridine and this was converted to its pyridinium salt by reacting with dimethyl sulfate. Preparation of this salt from the monomer is well known in the art. In each of the examples in Table 1, 100 parts of the monomer were used.

TABLE 1
*Preparation and Properties of High Viscosity Poly(1,2-Dimethyl-5-Vinyl Pyridinium Methyl Sulfate)*

| Example No. | Monomer conc., percent | Water, percent | $K_2S_2O_8$, percent | Cover | Bath temp., °C. | Reaction time, days | Conversion, percent | RSV | Variable |
|---|---|---|---|---|---|---|---|---|---|
| 1 | 86 | 16.7 | 0.0080 | Air | 25 | 1 | 95 | 16.5 | Monomer conc. |
| 2 | 75 | 33.3 | 0.0080 | ---do--- | 25 | 1 | 95 | 14.5 | Do. |
| 3 | 65 | 58.1 | 0.0080 | ---do--- | 25 | 3 | 95 | 12.3 | Do. |
| 4 | 55 | 81.8 | 0.0080 | ---do--- | 25 | 5 | 94 | 8.6 | Do. |
| 5 | 75 | 33.3 | 0.00040 | Nitrogen | 25 | 3.8 | 92 | 27.8 | Catalyst conc. |
| 6 | 75 | 33.3 | 0.0020 | ---do--- | 25 | 3.8 | 100 | 26.9 | Do. |
| 7 | 75 | 33.3 | 0.010 | ---do--- | 25 | 3.8 | 100 | 22.9 | Do. |
| 8 | 75 | 33.3 | 0.020 | ---do--- | 25 | 3.8 | 100 | 21.7 | Do. |
| 9 | 75 | 33.3 | 0.050 | ---do--- | 25 | 3.8 | 100 | 16.3 | Do. |
| 10 | 75 | 33.3 | 0.10 | ---do--- | 25 | 3.8 | 100 | 11.4 | Do. |
| 11 | 75 | 33.3 | 0.30 | ---do--- | 25 | 3.8 | 100 | 8.61 | Do. |
| 12 | 75 | 33.3 | 0.50 | ---do--- | 25 | 3.8 | 100 | 4.52 | Do. |
| 13 | 75 | 33.3 | 1.0 | ---do--- | 25 | 3.8 | 100 | 4.85 | Do. |
| 14 | 75 | 33.3 | None | Air | 25–30 | 3 | 98 | 17.2 | Do. |
| 15 | 75 | 33.3 | 0.0040 | ---do--- | 0 | 1 | 66 | | Temperature. |
| 16 | 75 | 33.3 | 0.0040 | ---do--- | 25 | 3 | 91 | 25.0 | Removal of air. |
| 17 | 75 | 33.3 | 0.0040 | Nitrogen | 25 | 3 | 91 | | Do. |
| 18 | 75 | 33.3 | 0.0040 | Air | 25 | 1.3 | 88 | 26.6 | Do. |

Although specific embodiments of the present invention are set forth in the foregoing examples, and other disclosures, this is not intended to limit the invention other than as defined in the claims hereof. The invention broadly comprises dissolving a water-soluble monomeric vinyl pyridinium salt in a solvent therefor to a concentration of at least about 50% and allowing the monomer to polymerize at a temperature of not above about 30° C.

The present invention is applicable to solution polymerization (including copolymerization) of monomeric water-soluble vinyl pyridinium salts including, but not limited to, those derived from 2-vinyl pyridine, 4-vinyl pyridine, 2-methyl-5-vinyl pyridine (e.g. 1,2-dimethyl-5-vinyl pyridinium methyl sulfate), 2-vinyl-5-ethyl pyridine.

Although water serves quite well as a solvent for the monomer, and one therefore normally would have no reason for desiring any other solvent, other solvents will work provided they are inert and will dissolve high concentrations of the monomer. For instance, mixtures of acetone or methanol with water work very satisfactorily.

The concentration of monomer must be high to give polymers of high viscosity. We have found that such concentration must be at least about 50% by weight and preferably 65%–85%. This will vary somewhat with the particular monomer as well as the other conditions employed. We have obtained excellent results using a concentration of 75% monomeric 1,2-dimethyl-5-vinyl pyridinium methyl sulfate in water, this concentration being near the saturation level. Moreover, concentrations near the saturation level give best results because the product viscosity increases with the concentration of monomer during the polymerization. A further advantage of using high concentrations of monomer is that the presence of the smaller amount of solvent makes a polymer firmer and otherwise easier to handle.

The polymerization may be conducted in the absence of a catalyst, but the use of a catalyst is preferred. Peroxygen compounds are preferred as catalyst, specifically potassium persulfate. The only limitation on the amount of catalyst is the maximum amount. As stated above, a catalyst is preferred but not necessary; however, when a catalyst is used, the preferred is potassium persulfate and the amount thereof should not exceed about 0.3%. Desirably, the amount of catalyst is 0.001%–0.008%, and more preferably 0.004%. As the amount of potassium persulfate increases above about 0.3%, the viscosity of the polymerization product decreases substantially.

There are both maximum and minimum limitations on the temperature of polymerization. Although the reaction temperature has the same general relation with reaction time and yields as one would expect, we have found that if the temperature exceeds about 30° C., the viscosity of the resulting polymers will be undesirably low. While temperatures below 0° C. may be used, they are less practical. A temperature of about 25° C. is preferred. Polymerization reaction temperature as referred to herein is the temperature of the water bath which contained the reaction vessel during the polymerization. The reaction temperature is exothermic and the polymerization product is produced as a rubber-like gel, so that proper dissipation of the heat of polymerization is necessary. During the polymerization reaction the highest temperature at any point in the polymer product being prepared should not exceed about 35° C. One means of accomplishing this is by using a reaction vessel which has a high surface to volume ratio. We have obtained very good results with long polyethylene tubes.

If the polymerization reaction vessel is completely filled, it is not necessary to replace the air therein with nitrogen. Unless the vessel is filled with the charge, however, there is enough oxygen in the unfilled space to justify displacing the air with nitrogen before starting the polymerization.

The polymerization reaction time is not critical and any skilled chemist can readily determine the time most suitable for his particular requirements. The polymerization reaction rate, however, is very important, and this is controlled by employing the above-described conditions of temperature, monomer concentration and catalyst concentration. In order to obtain the high viscosity polymers of the instant invention, we have found that it is necessary to polymerize at a relatively slow rate. If the temperature, monomer concentration and catalyst concentration exceed the limitations defined herein, the polymerization will proceed too rapidly to give polymers having the required degree of viscosity.

Various conventional means, e.g. drum drying, may be used to convert the polymer gel to a dry product.

The water-soluble polymers of this invention are useful in many fields including flocculation, retention aids, etc. To illustrate the use of the water-soluble polymers of this invention as a flocculant and the requirement for high viscosity polymers for this use, the following experiments were carried out.

Seven samples of 10% kaolin clay aqueous suspensions were prepared in 100 cc. glass stoppered graduated cylinders. Water was added to the resulting suspensions to bring the concentration of clay therein to 5%. 0.1% aqueous solutions were prepared from samples of poly(1,2-dimethyl-5-vinyl pyridinium methyl sulfate) and added to the clay suspensions, each polymer having a different viscosity and the amount of each polymer solution added to each sample of clay suspension being that required to give substantially the same amount of flocculation. The polymer was made by the process of the present invention. The aqueous clay suspensions and the aqueous polymer solutions were mixed together by 4 normal end-over-end turns of the cylinder. The amount of flocculation was determined by measuring several times at intervals over a total time of 10 minutes the amount of sediment which settled. There was practically no settling in a control run during this same 10-minute period. The control run was carried out the same way as the above runs except that no polymer or other flocculant was used. Table 2 below gives further details.

TABLE 2

*Variation of Flocculation Efficiency With Reduced Specific Viscosity (RSV) for Poly(1,2-Dimethyl-5-Vinyl Pyridinium Methyl Sulfate) and 5% Kaolin Clay Suspensions*

| Run No. | RSV | Amount of polymer required to give same result p.p.m.[1] |
|---|---|---|
| 1 | 3.6 | >500 |
| 2 | 4.8 | >500 |
| 3 | 7.0 | 400 |
| 4 | 10.1 | 350 |
| 5 | 18.6 | 250 |
| 6 | 24.9 | 165 |
| 7 | 31.5 | 90 |

[1] P.p.m. based on weight of clay solids.

An outstanding advantage of this invention is that it provides a practical process for the production of polymers having high viscosities which is an extremely important property for many uses. A further advantage is that it eliminates the necessity of handling large amounts of solvents for the polymerization step.

As many apparent and widely different embodiments of this invention may be made without departing from the spirit and scope thereof, it is to be understood that we do not limit ourselves to the specific embodiments thereof except as defined in the appended claims.

What we claim and desire to protect by Letters Patent is:

1. Process of preparing water-soluble polymers which comprises dissolving a water-soluble monomeric vinyl pyridinium salt in a solvent therefor to a concentration of about 65%–85% by weight of the monomer, and allowing the monomer to polymerize at 0° C.–25° C., said salt being the reaction product of a 2-methyl-5-vinyl pyridine and dimethyl sulfate, said polymers having a reduced specific viscosity of at least about 7 as measured on 0.5% solutions thereof in 0.2 molar aqueous sodium chloride.

2. Process of preparing water-soluble polymers which comprises dissolving a monomeric vinyl pyridinium salt in water to a concentration of about 65%–85% and dissolving in the water 0.001%–0.008% of potassium persulfate as polymerization catalyst therefor, and allowing the monomer to polymerize at 0° C.–25° C. in the substantial absence of air, all percentages being by weight based on the monomer, said salt being the reaction product of a 2-methyl-5-vinyl pyridine and dimethyl sulfate, said polymers having a reduced specific viscosity of at least about 7 as measured on 0.5% solutions thereof in 0.2 molar aqueous sodium chloride.

3. Process of claim 2 wherein said monomeric salt is monomeric 1,2-dimethyl-5-vinyl pyridinium methyl sulfate.

4. Process of claim 3 wherein the monomeric 1,2-dimethyl-5-vinyl pyridinium methyl sulfate salt is prepared by adding monomeric 2-methyl-5-vinyl pyridine and dimethyl sulfate to the water and allowing the resulting salt to dissolve in the water as formed, thereby effecting preparation of the salt and polymerization of the aqueous solution thereof substantially simultaneously without isolating the said salt from its reaction mixture.

References Cited in the file of this patent

UNITED STATES PATENTS 2,811,510    Leubner et al. _____ Oct. 29, 1957

FOREIGN PATENTS 484,309    Canada _____ June 24, 1952